US008606459B2

(12) United States Patent
Sekiyama et al.

(10) Patent No.: US 8,606,459 B2
(45) Date of Patent: Dec. 10, 2013

(54) FUEL ECONOMY DRIVING ASSISTANCE APPARATUS

(75) Inventors: Hiroaki Sekiyama, Setagaya-ku (JP); Yoshihiro Oe, Kawasaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 613 days.

(21) Appl. No.: 12/676,811

(22) PCT Filed: Sep. 5, 2008

(86) PCT No.: PCT/IB2008/002309
§ 371 (c)(1),
(2), (4) Date: Oct. 4, 2010

(87) PCT Pub. No.: WO2009/031021
PCT Pub. Date: Mar. 12, 2009

(65) Prior Publication Data
US 2010/0250059 A1     Sep. 30, 2010

(30) Foreign Application Priority Data

Sep. 6, 2007   (JP) ................................. 2007-231723

(51) Int. Cl.
*G06F 19/00* (2011.01)
(52) U.S. Cl.
USPC ........... 701/35; 701/36; 701/32.1; 340/425.5; 340/438; 340/439
(58) Field of Classification Search
None
See application file for complete search history.

(56) References Cited

U.S. PATENT DOCUMENTS

| | | | |
|---|---|---|---|
| 4,439,158 A | 3/1984 | Weber | |
| 4,542,460 A | 9/1985 | Weber | |
| 5,693,876 A * | 12/1997 | Ghitea et al. | 73/114.53 |
| 6,092,021 A * | 7/2000 | Ehlbeck et al. | 701/123 |
| 6,289,332 B2 * | 9/2001 | Menig et al. | 180/167 |
| 6,366,848 B1 * | 4/2002 | Gustavsson | 701/123 |
| 6,470,256 B1 * | 10/2002 | Cikalo et al. | 701/93 |
| 7,072,762 B2 * | 7/2006 | Minami et al. | 701/123 |
| 7,079,018 B2 * | 7/2006 | Hottebart et al. | 340/442 |
| 7,444,311 B2 * | 10/2008 | Engstrom et al. | 706/20 |
| 7,646,289 B2 * | 1/2010 | Tamai et al. | 340/439 |
| 8,116,971 B2 * | 2/2012 | Chen et al. | 701/123 |
| 2002/0116156 A1 * | 8/2002 | Remboski et al. | 702/188 |
| 2004/0030458 A1 * | 2/2004 | Entenmann | 701/1 |
| 2004/0093264 A1 * | 5/2004 | Shimizu | 705/13 |

(Continued)

FOREIGN PATENT DOCUMENTS

| | | |
|---|---|---|
| EP | 1 780 393 A1 | 5/2007 |
| JP | 2001-108503 A | 4/2001 |

(Continued)

OTHER PUBLICATIONS

Office Action issued May 3, 2012 in CN 2008880105892.4 and English translation thereof.

*Primary Examiner* — Jonathan M Dager
(74) *Attorney, Agent, or Firm* — Kenyon & Kenyon LLP (57) ABSTRACT

A fuel economy driving assistance apparatus includes advice provision means for providing a driver with driving advice that contributes to improvement of fuel economy of a vehicle; driving tendency estimation means for estimating a driving tendency of the driver in each driving situation; and advice mode changing means for changing a mode of the driving advice, according to the driving tendency of the driver estimated by the driving tendency estimation means.

19 Claims, 4 Drawing Sheets

(56) References Cited

U.S. PATENT DOCUMENTS

| | | | |
|---|---|---|---|
| 2005/0131597 A1* | 6/2005 | Raz et al. | 701/29 |
| 2005/0143876 A1* | 6/2005 | Tanase | 701/22 |
| 2005/0278055 A1* | 12/2005 | Ferguson et al. | 700/111 |
| 2007/0001831 A1* | 1/2007 | Raz et al. | 340/439 |
| 2007/0027593 A1* | 2/2007 | Shah et al. | 701/30 |
| 2007/0143002 A1* | 6/2007 | Crowell et al. | 701/123 |
| 2007/0256481 A1* | 11/2007 | Nishiyama et al. | 73/113 |
| 2007/0276582 A1* | 11/2007 | Coughlin | 701/123 |
| 2008/0015767 A1* | 1/2008 | Masuda et al. | 701/99 |
| 2008/0042489 A1* | 2/2008 | Lewis et al. | 303/152 |
| 2008/0105482 A1* | 5/2008 | Yamaguchi et al. | 180/271 |
| 2008/0120175 A1* | 5/2008 | Doering | 705/14 |
| 2009/0043467 A1* | 2/2009 | Filev et al. | 701/57 |
| 2011/0205044 A1* | 8/2011 | Enomoto et al. | 340/439 |

FOREIGN PATENT DOCUMENTS

| | | |
|---|---|---|
| JP | 2003-111208 A | 4/2003 |
| JP | 2003-316864 A | 11/2003 |
| JP | 2004-007969 A | 1/2004 |
| JP | 2004-248455 A | 9/2004 |
| JP | 2004-270580 A | 9/2004 |
| JP | 2004-360657 A | 12/2004 |
| JP | 2006-350567 A | 12/2006 |
| JP | 2007-156704 A | 6/2007 |
| WO | WO 2006/070511 A1 | 7/2006 |
| WO | 2006/136897 A1 | 12/2006 |

* cited by examiner

| ADVICE OUTPUT CONDITION | ADVICE NUMBER | ADVICE CONTENT |
|---|---|---|
| DISTANCE TO DESTINATION ≤ D AND REMAINING BATTERY CHARGE ≥ $C_1$ | 1 | IF VEHICLE TRAVELS AT LITTLE SLOWER SPEED, FUEL ECONOMY WILL BE IMPROVED. |
| | 2 | IF ACCELERATOR PEDAL IS NOT DEPRESSED, FUEL ECONOMY WILL BE FURTHER IMPROVED. |
| VEHICLE ENTERS DOWNWARD SLOPE | 4 | IF SHIFT LEVER IS MOVED TO BRAKE RANGE ON DOWNWARD SLOPE, FUEL ECONOMY WILL BE IMPROVED. |
| | 5 | IF VEHICLE IS DECELERATED AFTER SHIFT LEVER IS MOVED TO BRAKE RANGE, FUEL ECONOMY WILL BE IMPROVED. |
| REMAINING BATTERY CHARGE ≤ $C_2$ | 7 | IF SHIFT LEVER IS MOVED TO BRAKE RANGE ON DOWNWARD SLOPE, FUEL ECONOMY WILL BE IMPROVED. |
| | 8 | ACCELERATE AND DECELERATE VEHICLE REPEATEDLY UNTIL 60 km/h. |
| | 9 | DEPRESS BRAKE LITTLE LONGER. |
| | 10 | MOVE SHIFT LEVER TO BRAKE RANGE WHEN BRAKE IS APPLIED. |
| | 11 | MOVE SHIFT LEVER TO BRAKE RANGE TO EFFICIENTLY PRODUCE ELECTRIC ENERGY WHEN VEHICLE IS DECELERATED. |
| WHEN BATTERY IS NOT EFFECTIVELY USED | 13 | IF ACCELERATOR PEDAL IS DEPRESSED LITTLE MORE SLOWLY, FUEL ECONOMY WILL BE IMPROVED. |
| | 14 | IF VEHICLE TRAVELS AT LITTLE LOWER SPEED, FUEL ECONOMY WILL BE IMPROVED. |
| | 15 | IF BRAKE IS DEPRESSED LITTLE MORE SLOWLY, FUEL ECONOMY WILL BE IMPROVED. |
| | 16 | IF VEHICLE TRAVELS AT CONSTANT SPEED ON EXPRESSWAY, FUEL ECONOMY WILL BE IMPROVED. |

FIG. 3A

| ADVICE PROVISION LEVEL $LV_A$ | ADVICE PROVISION MANNER |
|---|---|
| 1 | ADVICE IS NOT PROVIDED |
| 2 | ADVICE IS PROVIDED USING VOICE |
| 3 | ADVICE IS PROVIDED USING VOICE AND VISUAL DISPLAY |

FIG. 3B

| ADVICE PROVISION LEVEL $LV_B$ | ADVICE PROVISION FREQUENCY |
|---|---|
| 1 | ADVICE IS PROVIDED ONCE WHEN OUTPUT CONDITION IS SATISFIED TEN TIMES |
| 2 | ADVICE IS PROVIDED ONCE WHEN OUTPUT CONDITION IS SATISFIED FIVE TIMES |
| 3 | ADVICE IS PROVIDED WHEN OUTPUT CONDITION IS SATISFIED ONCE |

FIG. 4

FUEL ECONOMY DRIVING ASSISTANCE APPARATUS

BACKGROUND OF THE INVENTION

1. Field of the Invention

The invention relates to a fuel economy driving assistance apparatus that provides a driver with driving advice that contributes to improvement of fuel economy of a vehicle.

2. Description of the Related Art

For example, Japanese Patent Application Publication No. 2001-108503 (JP-A-2001-108503) describes a fuel consumption measurement apparatus that indicates a fuel consumption tendency specific to a vehicle, by measuring fuel consumption while the vehicle travels for a relatively long period. The fuel consumption measurement apparatus measures the fuel consumption of the vehicle during traveling under a plurality of measurement conditions (for example, conditions relating to a battery replacement interval, an oil change interval, a fueling interval, and a vehicle key on/off interval), and indicates the measured fuel consumption and a fuel consumption standard under the measurement conditions so that the driver accurately understands the current fuel consumption.

However, technologies described in the publication JP-A-2001-108503 may not finally lead to improvement of fuel economy unless the driver drives the vehicle in accordance with advice for the improvement of fuel economy provided based on the measured fuel consumption.

SUMMARY OF THE INVENTION

The invention provides a fuel economy driving assistance apparatus that provides a driver with advice relating to fuel consumption, which is readily acceptable to the driver.

A first aspect of the invention relates to a fuel economy driving assistance apparatus that includes advice provision means for providing a driver with driving advice that contributes to improvement of fuel economy of a vehicle; driving tendency estimation means for estimating a driving tendency of the driver in each driving situation; and advice mode changing means for changing a mode of the driving advice, according to the driving tendency of the driver estimated by the driving tendency estimation means.

Thus, it is possible to provide the driving advice in the mode corresponding to the driving tendency of the driver. Therefore, the driver is more likely to follow the driving advice.

When the driving tendency of the driver is estimated to be that the driver is less likely to accept the driving advice, the advice mode changing means may change the mode of the driving advice to decrease an effect of the driving advice.

When the driving tendency of the driver is estimated to be that the driver is less likely to accept the driving advice, the advice mode changing means may decrease an advice provision level.

When the driving tendency of the driver is estimated to be that the driver is likely to accept the driving advice, the advice mode changing means may change the mode of the driving advice to increase an effect of the driving advice.

When the driving tendency of the driver is estimated to be that the driver is likely to accept the driving advice, the advice mode changing means may increase an advice provision level.

In a situation in which a driving load of the driver is high, the advice mode changing means may stop providing the driving advice, regardless of the driving tendency of the driver estimated by the driving tendency estimation means.

In a situation in which the vehicle travels on a curved road, the advice mode changing means may stop providing the driving advice, regardless of the driving tendency of the driver estimated by the driving tendency estimation means.

The fuel economy driving assistance apparatus may further include vehicle travel record storage means for storing a record of travel of the vehicle. The driving tendency estimation means may estimate the driving tendency of the driver using the record of the travel of the vehicle.

The driving tendency estimation means may estimate the driving tendency of the driver using a state amount of the vehicle detected after the driving advice is provided to the driver.

The driving tendency estimation means may estimate the driving tendency of the driver based on the number of mismatched times between a content of the driving advice and driving operation performed by the driver during a predetermined period after the driving advice is provided to the driver.

The advice mode changing means may change at least one of an advice provision manner and advice content, according to the driving tendency of the driver.

When the driving tendency of the driver is estimated to be that the driver is likely to accept the driving advice, the advice mode changing means may change the advice provision manner so that the driving advice is provided to the driver using voice.

When the driving tendency of the driver is estimated to be that the driver is likely to accept the driving advice, the advice mode changing means may change the mode of providing the driving advice so that the driving advice is provided to the driver using voice and a visual display.

When the driving tendency of the driver is estimated to be that the driver is likely to accept the driving advice, the advice mode changing means may increase a frequency of the advice that is provided to the driver.

The fuel economy driving assistance apparatus may further include fuel-consumption reduction route search means for searching for a fuel consumption reduction route to a destination, based on information relating to at least one of a driving plan of the driver, a traffic situation, and a state amount of the vehicle, and the advice provision means may provide the driver with the fuel consumption reduction route.

The fuel-consumption reduction route search means may search for the fuel consumption reduction route based on information relating to at least one of traffic congestion, a road inclination, and a curved road, in an area extending to the destination of the driver, through an area extending to the destination of the driver.

When the vehicle uses an engine and a motor as a driving source, the fuel-consumption reduction route search means may search for the fuel consumption reduction route in which the motor is preferred to the engine as the driving source, based on at least one of a distance to a destination of the driver, a remaining battery charge, and a road inclination.

The fuel economy driving assistance apparatus may further include driver authentication means for identifying a driver. The advice mode changing means may change a mode of the driving advice according to the driving tendency of the identified driver.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
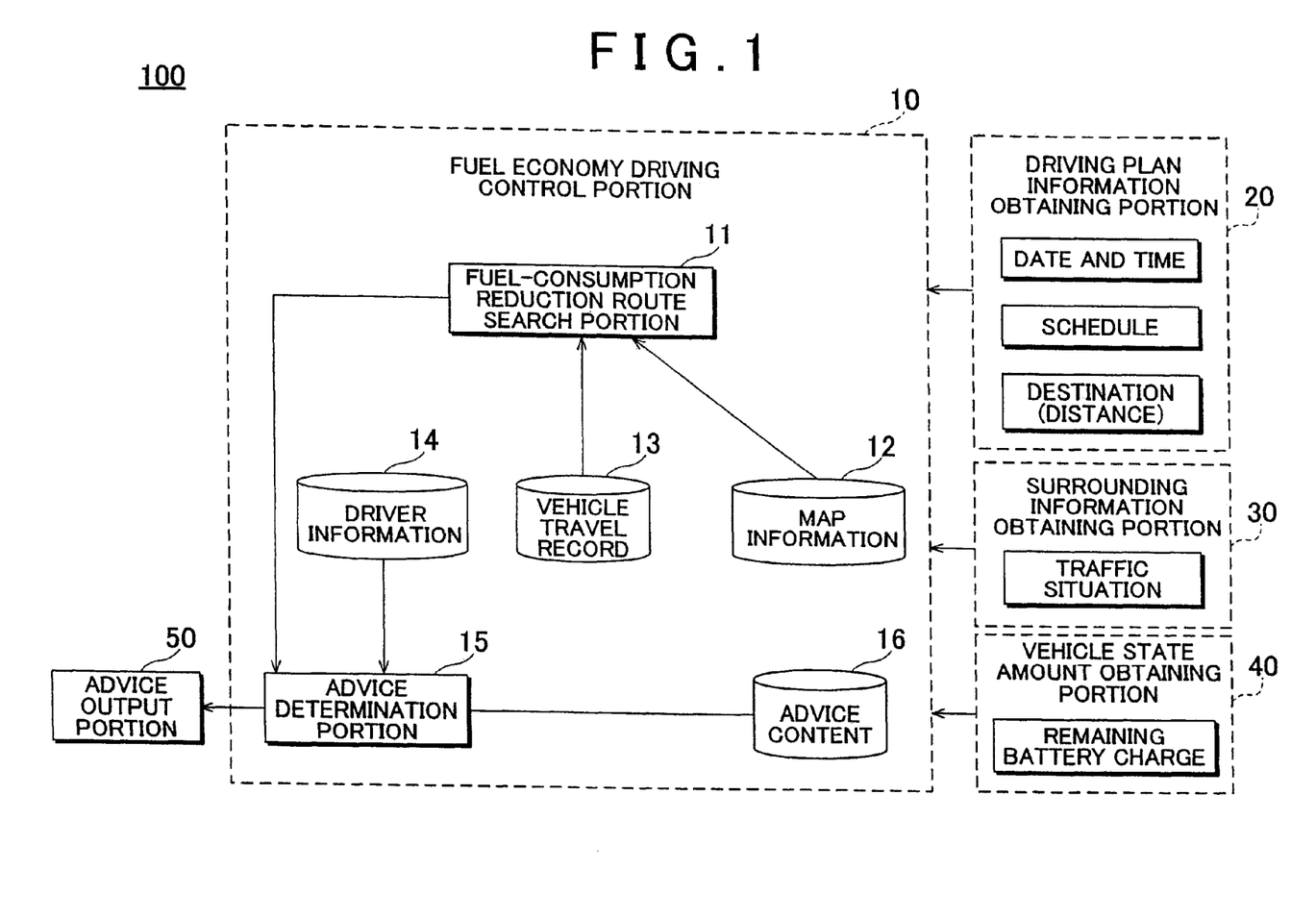
FIG. 1 is a block diagram showing a configuration of a fuel economy driving assistance apparatus according to an embodiment of the invention.

Hereinafter, an embodiment of the invention will be described with reference to the drawings. FIG. 1 is block diagram showing a configuration of a fuel economy driving assistance apparatus 100 according to the embodiment of the invention. The fuel economy driving assistance apparatus 100 includes a fuel economy driving control portion 10, a driving plan information obtaining portion 20, a surrounding information obtaining portion 30, a vehicle state amount obtaining portion 40, and an advice output portion 50. The fuel economy driving control portion 10 of the fuel economy driving assistance apparatus 100 determines a mode of a driving advice that contributes to improvement of fuel economy of a vehicle (hereinafter, the advice will be referred to as "fuel economy advice"), based on information obtained from the driving plan information obtaining portion 20, the surrounding information obtaining portion 30, and the vehicle state amount obtaining portion 40. The fuel economy advice is provided to a driver through the advice output portion 50. Hereinafter, a configuration of each portion of the fuel economy driving assistance apparatus 100 will be described.

The driving plan information obtaining portion 20 obtains information relating to a future driving plan required to generate the fuel economy advice (hereinafter, the information may be referred to as "driving plan information"). For example, the driving plan information may include driving date and time, a driver's schedule for driving the vehicle, a destination of the vehicle, a current location of the vehicle, and a distance between the current location of the vehicle and a reference location. The positional information, such as information relating to the current location of the vehicle, is detected based on, for example, a positional signal obtained from a GPS receiver that receives an orbit signal from a GPS satellite.

The surrounding information obtaining portion 30 obtains information relating to a surrounding area around the vehicle, which is required to generate the fuel economy advice. For example, the surrounding information obtaining portion 30 obtains road traffic information, such as information relating to current traffic congestion, current construction work, and a road traffic regulation. The information relating to the surrounding area (hereinafter, may be referred to as "surrounding information") is obtained, for example, through wireless communication with an information management center, wireless communication such as inter-vehicle communication and road-vehicle communication, or data broadcasting. The surrounding information may include map information described later.

The vehicle state amount obtaining portion 40 obtains vehicle state amounts required to generate the fuel economy advice. The vehicle state amounts are detected, for example, by sensors provided in the vehicle, which include switches and an ECU. The vehicle state amounts may be regarded as current state amounts that indicate a traveling state of the vehicle, a traveling environment around the vehicle, and the like. Examples of the vehicle state amounts may include a battery state (a remaining battery charge, a voltage, an electric current, and the like), a vehicle speed, acceleration of the vehicle, an engine rotational speed, a steering angle, a roll angle, a yaw rate, a vehicle inclination angle, and meteorological conditions such as an external temperature and weather.

The vehicle state amount obtaining portion 40 may include driving operation detection portion that detects an amount of driving operation performed by the driver of the vehicle, as the vehicle state amount. For example, the driving operation detection portion may be regarded as "sensors" and "switches" used to detect the amount of driving operation performed by the driver. More specifically, the vehicle state amount obtaining portion 40 may include an accelerator position sensor, an accelerator switch, a brake position sensor, and a brake switch that make it possible to detect an amount of acceleration operation performed by the driver, and an amount of deceleration operation performed by the driver, a steering angle sensor that makes it possible to detect an amount of steering operation performed by the driver, a shift position sensor and a clutch switch that make it possible to detect an amount of gear-shift operation performed by the driver, and a winker switch that makes it possible to detect an amount of operation for turning the vehicle or changing lanes, which is performed by the driver.

The accelerator position sensor and the brake position sensor are provided in a pedal portion operated by the foot of the driver who sits on a driver seat. The accelerator position sensor detects a stroke (angle) of an accelerator pedal, and the brake position sensor detects a stroke (angle) of a brake pedal. It is possible to calculate a depression amount of each pedal operated by the driver, based on the detected value. The accelerator switch detects the depression of the accelerator pedal. For example, when the accelerator pedal is depressed, the accelerator switch is "on". When the accelerator pedal is not depressed, the accelerator switch is "off". It is possible to determine whether the driver intends to accelerate the vehicle, based on the detected value. When the brake pedal is depressed, the brake switch is "on". When the brake pedal is not depressed, the brake switch is "off". It is possible to determine whether the driver intends to decelerate the vehicle, based on the detected value. The steering angle sensor is provided in a steering portion of the driver seat, and detects a steering angle of a steering wheel. It is possible to calculate the amount of steering operation performed by the driver, based on the detected value. Also, the shift position sensor detects a shift position to which the driver moves a shift lever (for example, a range D, a range R, and gear positions from a first gear to a sixth gear). The clutch switch makes it possible to determine whether the driver operates the clutch. The winker switch makes it possible to detect the operation for turning the vehicle to the right or left, or the operation for changing lanes.

The fuel economy driving control portion 10 includes a fuel-consumption reduction route search portion 11 and an advice determination portion 15. The fuel economy driving control portion 10 determines the mode of the fuel economy advice according to the driving tendency of the driver. For example, the fuel economy driving control portion 10 determines an advice provision manner and advice content, as the mode of the fuel economy advice, and appropriately corrects the advice provision manner and the advice content according to the driving tendency of the driver. The advice provision manner is a manner in which the fuel economy advice is provided to the driver. For example, the advice provision manner includes a frequency of providing the fuel economy advice (hereinafter, may be referred to as "advice provision frequency"), such as the number of times that the fuel economy advice is provided, and a time at which the fuel economy advice is provided, a location at which the fuel economy advice needs to be provided, and a mode of providing the fuel economy advice (hereinafter, may be referred to as "advice provision mode"), such as a display mode or a voice mode. The advice content is the content of the fuel economy advice provided to the driver. For example, the advice content includes a fuel consumption reduction route that makes it possible to reduce the fuel consumption, among travel routes to the destination, and a driving operation manner that makes it possible to reduce the fuel consumption. Because the fuel economy advice is driving advice that contributes to improvement of fuel economy, the advice content may be information useful for examining improvement of fuel economy, or information for prompting the driver to improve fuel economy. For example, the advice content may include fuel consumption information such as instantaneous fuel consumption and total average fuel consumption, an amount of discharged exhaust gas, a maximum distance that the vehicle can cruise, a total average vehicle speed, a total traveling time, and information for reducing the fuel consumption and information relating to ecology.

The fuel-consumption reduction route search portion 11 searches for at least one travel route that makes it possible to reduce the fuel consumption, among routes to the destinations. If a plurality of fuel consumption reduction routes are located, the routes are ranked according to the degree of a fuel consumption reduction effect. The route that makes it possible to obtain the largest fuel consumption reduction effect may be regarded as "optimal fuel consumption route". The fuel-consumption reduction route search portion 11 searches for, and determines the fuel consumption reduction route, using the driving plan information obtained by the driving plan information obtaining portion 20, the surrounding information obtained by the surrounding information obtaining portion 30, the vehicle state amount obtained by the vehicle state amount obtaining portion 40, and the map information stored in a map database 12. For example, the map information stored in the map database 12 includes road type information relating to an ordinary road, a toll road, and the like, information relating to a straight road, a curved road, a fork road, an intersection, and a slope, and construction information relating to a tunnel, a crossing, a bridge, a building, a parking place, a toll station for a toll road, and an electronic toll collection system, along with coordinate data on each location (each node). The map information may include detailed auxiliary information relating to each location, for example, information relating to a radius of a curve, a curvature, a cant, a road inclination, the number of lanes on a road, a lane width, the position of a stop line, lanes for turning to the right/left, and an altitude, and regulation information relating to a legal speed and the like.

For example, in a so-called "hybrid vehicle" that uses an engine and a motor as driving sources, the fuel-consumption reduction route search portion 11 searches for the fuel consumption reduction route that makes it possible for the vehicle to reach the destination using the motor as the driving source while reducing the consumption of fuel by the engine, based on the map information relating to an area extending to the destination, such as slope information, and the state of the battery, taking into account regeneration of electric power by the motor. Also, the fuel-consumption reduction route search portion 11 searches for the fuel consumption reduction route that makes it possible for the vehicle to reach the destination while suppressing the fuel consumption by limiting an output from the engine, based on the map information. In the hybrid vehicle and an engine-driven vehicle, any appropriate method may be employed as the method of searching for the fuel consumption reduction route, and thus, the detailed description thereof will be omitted.

The advice determination portion 15 causes the advice output portion 50 (described later) to output the fuel economy advice according to a predetermined advice output condition. For example, the advice determination portion 15 causes the advice output portion 50 to display the fuel consumption reduction route located by the fuel-consumption reduction route search portion 11, according to a predetermined output display condition.

Figure 2:
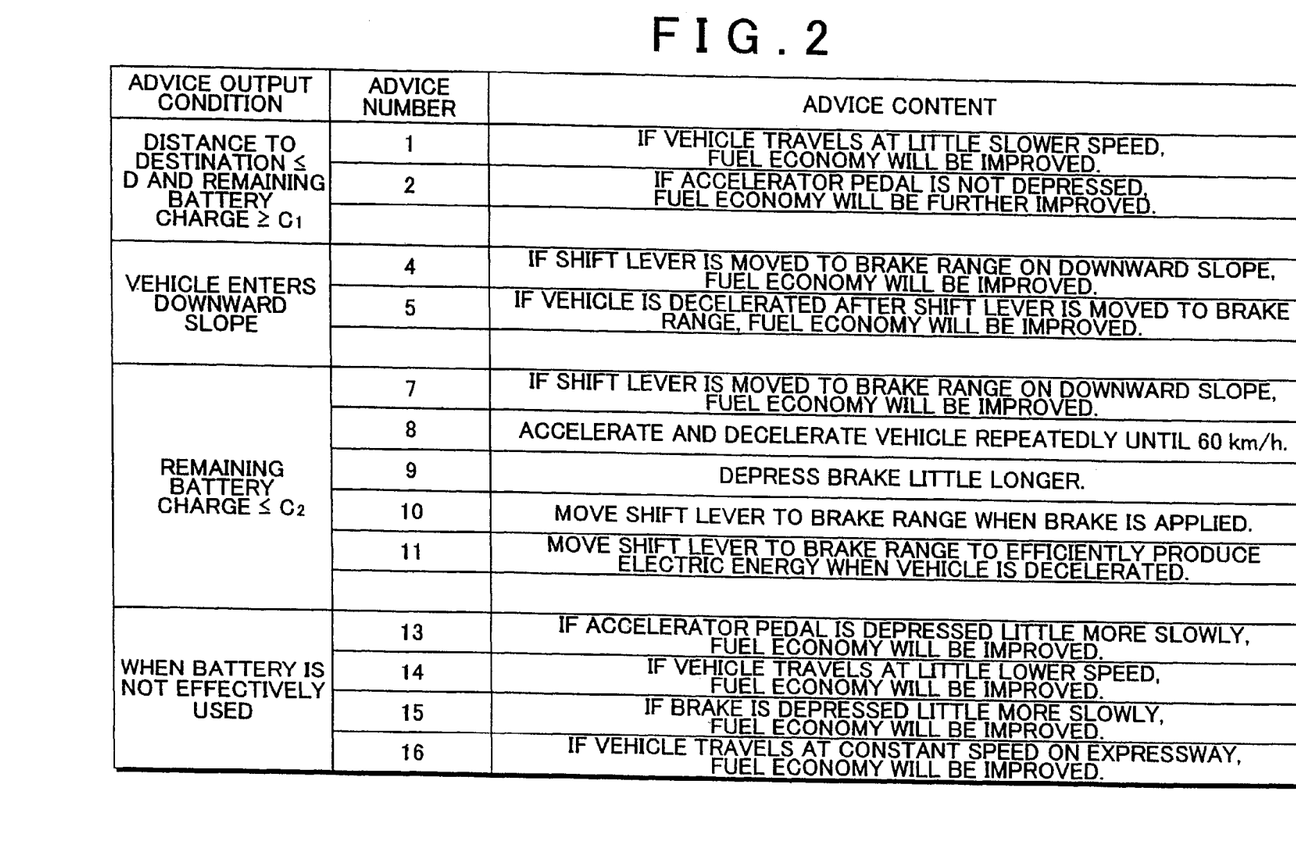
FIG. 2 is a diagram showing a relation between an advice output condition and an advice content.

The advice determination portion 15 causes the advice output portion 50 to display and/or output, using voice, the fuel economy advice relating to a driving operation manner that makes it possible to reduce the fuel consumption (a fuel consumption reduction operation manner), according to the advice output condition relating to the driving operation manner as shown in FIG. 2. The advice contents shown in FIG. 2 assigned with advice numbers are stored in the advice database 16 shown in FIG. 1. For example, when the remaining battery charge obtained by the vehicle state amount obtaining portion 40 is equal to or lower than a predetermined level C2, the advice determination portion 15 causes the advice output portion 50 to output at least one of the advice contents assigned with the advice numbers 7 to 11 read from the advice database 16. The other advice contents shown in FIG. 2 are output in the same manner. The relation between the advice output condition and the advice content is not limited to the relation shown in FIG. 2, and may be appropriately set.

Also, the advice determination portion 15 changes the advice provision mode (for example, the advice content shown in FIG. 2) output from the advice output portion 50, according to an advice provision level LV. The advice provision level LV is a scale indicating the degree of the fuel economy advice provided to the driver. The advice provision level LV changes according to the driving tendency of the driver, and stored in the database 14 as the information relating to the driver. The advice provision level LV will be described in detail later.

Figure 3A:
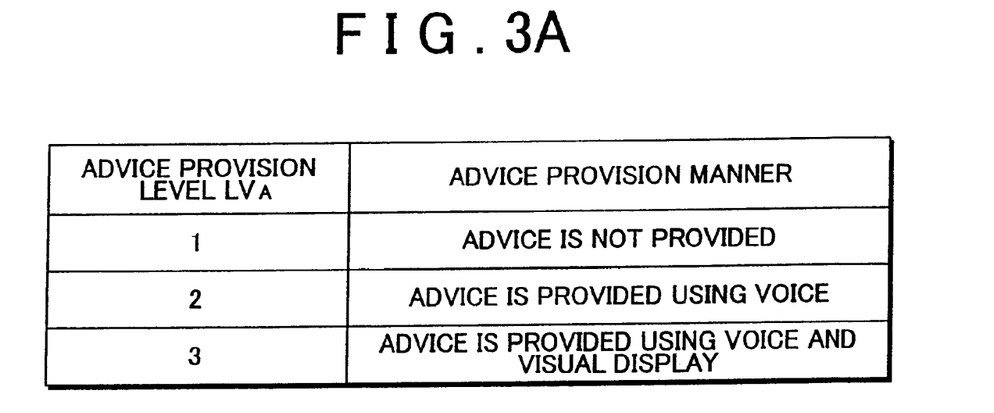
FIGS. 3A and 3B are diagrams each showing a relation between an advice provision level and a advice provision mode.
Figure 3B:
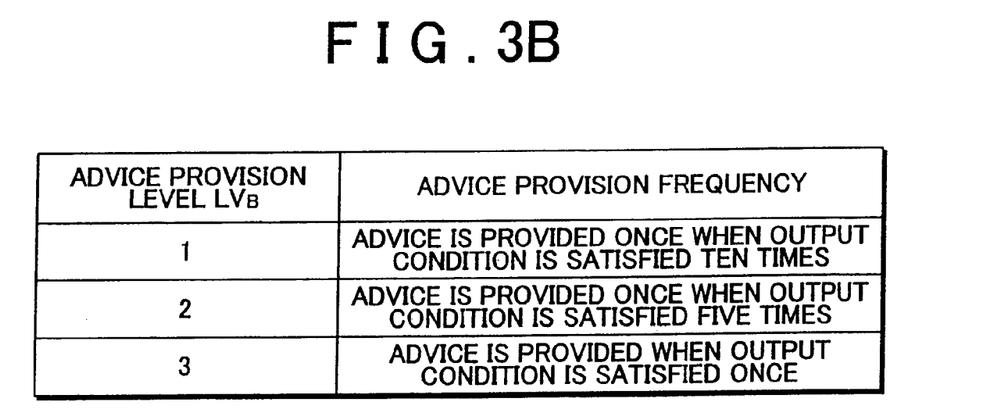

FIG. 3A shows a relationship between the advice provision level LV and the advice provision mode output from the advice output portion 50. FIG. 3B shows a relationship between the advice provision level LV and the advice provision frequency, that is, the frequency of outputting the fuel economy advice from the advice output portion 50. In FIG. 3A, as the advice provision level $LV_A$ becomes higher, the more detailed fuel economy advice is output from the advice output portion 50. In FIG. 3A, when the advice provision level $LV_A$ is 3 ($LV_A=3$), the fuel economy advice is output in two provision modes, that is, the fuel economy advice is provided using voice and a visual display. When the advice provision level $LV_A$ is 2 ($LV_A=2$), the fuel economy advice is output in one provision mode, that is, the fuel economy advice is provided using voice, but not visually displayed. When the advice provision level $LV_A$ is 1 ($LV_A=1$), the fuel economy advice is not output. That is, by changing the advice provision level $LV_A$ according to the driving tendency of the driver, it is possible to change the mode of providing the fuel economy advice.

In FIG. 3B, when the advice provision level $LV_B$ is 3 ($LV_B=3$), the fuel economy advice is output once when the advice output condition is satisfied once. When the advice provision level $LV_B$ is 1 ($LV_B=1$), the fuel economy advice is output once when the advice output condition is satisfied ten times. That is, by changing the advice provision level $LV_B$ according to the driving tendency of the driver, it is possible to increase/decrease the advice provision frequency.

In the case where the remaining battery charge obtained by the vehicle state amount obtaining portion 40 is equal to or lower than a predetermined level C2 (refer to FIG. 2), when the advice provision level LV is 3 (LV=3), all the advice contents assigned with the advice numbers 7 to 11 are output, and when the advice provision level LV is 1 (LV=1), the advice contents assigned with advice numbers 7 to 9 are output. That is, by changing the advice provision level LV, it is possible to change the content of the fuel economy advice that is provided.

The advice determination portion 15 estimates the driving tendency of the driver (for example, a habit of the driver, a driving skill of the driver, and a manner in which the driver uses the vehicle), based on a vehicle travel record that is a record relating to a driving situation and driving operation. The vehicle travel record for each driver is stored in the vehicle travel record database 13. For example, the vehicle travel record database 13 stores, as the vehicle travel record, a driving operation amount in each driving situation, which is obtained by the vehicle state amount obtaining portion 40.

For example, when a statistic value, such as an average value of the driving operation amount in each driving situation, is stored in the vehicle travel record database 13 as the vehicle travel record, the advice determination portion 15 determines how the driver performs driving operation in each driving situation, by referring to the statistic value. That is, the advice determination portion 15 estimates the driving tendency of the driver in each driving situation. For example, if a brake operating time is shorter than a reference value during a predetermined period from a time point at which the fuel economy advice that prompts the driver to decelerate the vehicle is output, the advice determination portion 15 estimates that the driver has the driving tendency to ignore the fuel economy advice.

Also, for example, the advice determination portion 15 estimates the driving tendency of the driver, based on the number of times that the driver's driving operation after the fuel economy advice is output is not in accordance with the content of the fuel economy advice. For example, when the number of times that the driver's driving operation is not in accordance with the content of the fuel economy advice exceeds a predetermined number of times (for example, five times), the advice determination portion 15 estimates that the driver has the driving tendency to ignore the fuel economy advice. Similarly, the advice determination portion 15 estimates the driving tendency of the driver, based on the number of times that a route on which the vehicle travels after the fuel economy advice is output is not in accordance with the fuel consumption reduction route provided by the fuel economy advice. For example, the advice determination portion 15 estimates that the driver's tendency to ignore the fuel economy advice increases with an increase in the number of times that the route on which the vehicle travels is not in accordance with the fuel consumption reduction route.

Also, the advice determination portion 15 reads, from the vehicle travel record database 13, the average value of the driving operation amounts in the same or similar driving situations as or to the driving situation in which the current driving operation amount is detected by the vehicle state amount obtaining portion 40. The advice determination portion 15 determines whether the current driving operation is due to the driving tendency of the driver, such as the habit or the driving skill, by comparing the average value of the driving operation amounts read from the vehicle travel record database 13, with the current driving operation amount. When a difference between the average value of the driving operation amounts in the same or similar driving situations and the current driving operation amount is in a predetermined reference range, the advice determination portion 15 determines that the current driving operation is close to the tendency of the driving operation estimated based on the record of the previous driving operation, and determines that the current driving operation is due to the driving tendency of the driver, such as the habit of the driver. When the difference between the average value of the driving operation amounts in the same or similar driving situations and the current driving operation amount is out of the predetermined reference range, the advice determination portion 15 determines that the current driving operation is not close to the tendency of the driving operation estimated based on the record of the previous driving operation, and determines that the current driving operation is not due to the driving tendency of the driver, such as the habit of the driver. The driving operation that is not due to the driving tendency of the driver is assumed to be unusual driving operation such as the driving operation for avoiding an accident or the driving operation at the time of emergency. By estimating the driving tendency of the driver using the record of the previous driving operation, it is possible to improve the estimation accuracy using the learning effect.

Also, when the driving plan information obtained by the driving plan information obtaining portion 20 is stored in the vehicle travel record database 13 as the vehicle travel record, the advice determination portion 15 determines how the driver uses the vehicle, by referring to the stored driving plan information. That is, the advice determination portion 15 estimates the manner in which the driver uses the vehicle. For example, when a vehicle usage rate for the weekend is calculated to be equal to or higher than a predetermined value based on the driving date/time information relating to the driving date and time, the advice determination portion 15 estimates that the driver uses the vehicle for a recreational purpose. When the number of times that the driver drives the vehicle in the same time zone on weekdays is equal to or larger than a predetermined number according to the driving date/time information, the advice determination portion 15 estimates that the driver uses the vehicle for commuting.

The advice output portion 50 may be regarded as "the advice provision means" for providing the fuel economy advice generated by the fuel economy driving control portion 10 to the driver. For example, the advice output portion 50 may be a voice output device that provides the fuel economy advice using voice, such as a speaker, and a display device that provides the fuel economy advice using a screen display.

Figure 4:
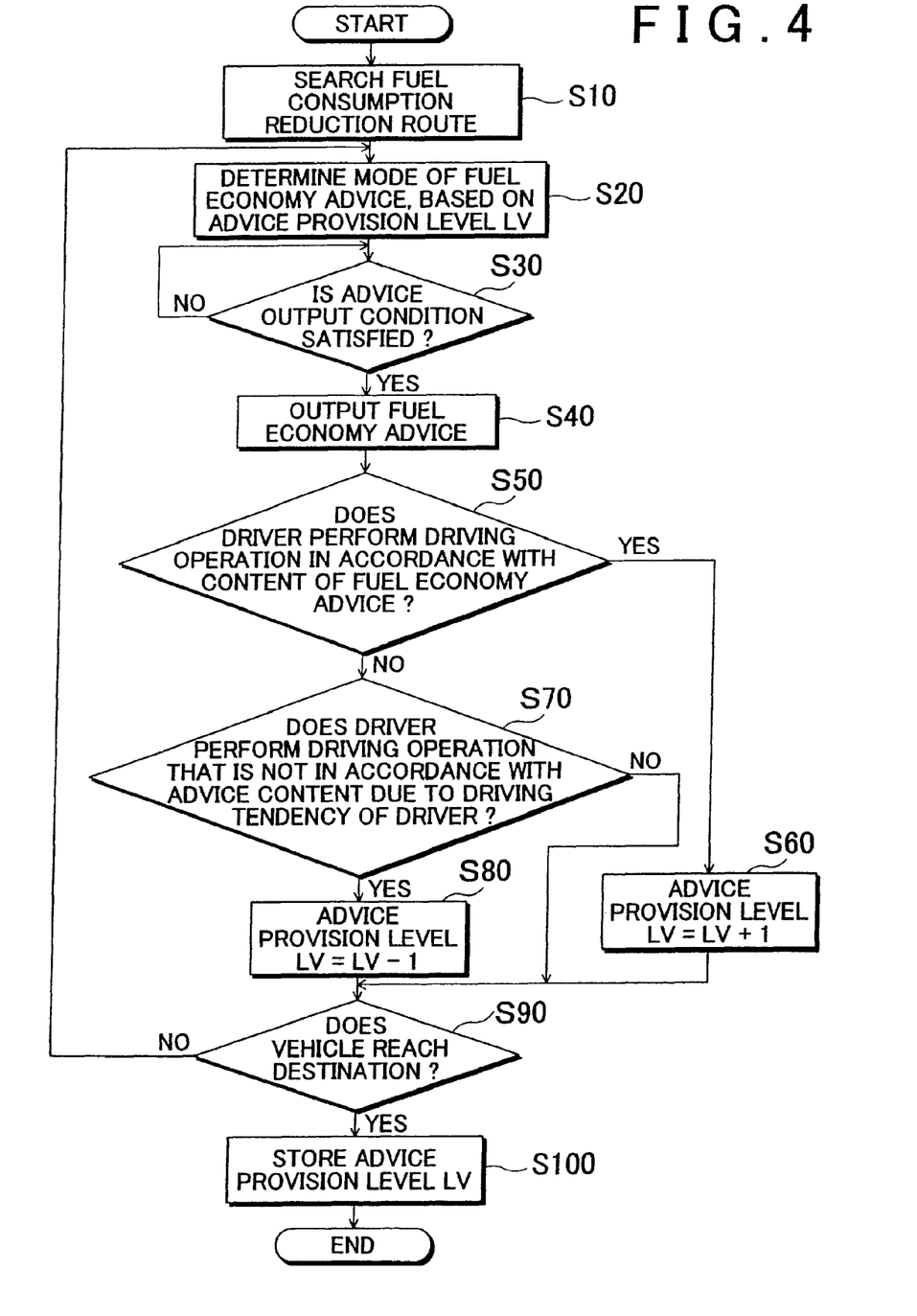
FIG. 4 is a flowchart showing operation of the fuel economy driving assistance apparatus.

FIG. 4 is a flowchart showing operation of a fuel economy driving assistance apparatus 100. When the fuel-consumption reduction route search portion 11 receives an operation start command from the fuel economy driving assistance apparatus 100, the fuel-consumption reduction route search portion 11 searches for the fuel consumption reduction route in the above-described manner, and locates the route (step S10). When the advice determination portion 15 receives the operation start command from the fuel economy driving assistance apparatus 100, the advice determination portion 15 reads the advice provision level LV from a driver database 14, and determines the mode of the fuel economy advice such as the advice provision mode and the advice provision frequency, according to the advice provision level LV as shown in FIG. 3 (step S20). When the advice output condition as shown in FIG. 2 is satisfied while the vehicle is driving the fuel consumption reduction route located by the fuel-consumption reduction route search portion 11 (YES in step S30), the advice determination portion 15 causes the advice output portion 50 to output the fuel economy advice in the mode corresponding to the advice provision level LV (step S40).

The advice determination portion 15 determines whether the driver performs the driving operation in accordance with the content of the output fuel economy advice, based on the vehicle state amount obtained by the vehicle state amount obtaining portion 40 during a period from when the fuel economy advice is output until when a predetermined time (for example, three seconds) elapses (step S50). When the advice determination portion 15 determines that the driver performs the driving operation in accordance with the content of the output fuel economy advice (YES in step S50), the advice determination portion 15 determines that the driver follows the fuel economy advice, and increments the advice provision level LV (step S60). By incrementing the advice provision level LV, the next fuel economy advice is output in a more detailed manner. For example, when the current advice provision level LV is 2, the fuel economy advice is provided in one provision mode, that is, the fuel economy advice is provided using only voice as shown in FIG. 3A. By incrementing the advice provision level LV to 3, the next fuel economy advice is provided in two provision modes, that is, the next fuel economy advice is provided using voice and a visual display as shown in FIG. 3A. When the advice determination portion 15 determines that the driver follows the fuel economy advice, the advice determination portion 15 increases the advice provision frequency by incrementing the provision level LV, as shown in FIG. 3B.

When the advice determination portion 15 determines that the driver performs the driving operation that is not in accordance with the content of the output fuel economy advice (NO in step S50), the advice determination portion 15 determines whether the driver performs the driving operation that is not in accordance with the content of the output fuel economy advice, due to the driving tendency of the driver, such as the habit of the driver or the driving skill of the driver (step S70). When the advice determination portion 15 determines that the driver performs the driving operation that is not in accordance with the content of the output fuel economy advice, due to the driving tendency of the driver (YES in step S70), the advice determination portion 15 determines that the driver has the driving tendency to ignore the fuel economy advice, and decrements the advice provision level LV (step S80). By decrementing the advice provision level LV, the next fuel economy advice is provided in a less detailed manner. For example, when the current advice provision level LV is 2, the fuel economy advice is provided in one provision mode, that is, the fuel economy advice is provided using only voice as shown in FIG. 3A. By decrementing the advice provision level LV to 1, the next fuel economy advice is not provided as shown in FIG. 3A. When the advice determination portion 15 determines that the driver ignores the fuel economy advice, the advice determination portion 15 increases the advice provision frequency as shown in FIG. 3B, by incrementing the advice provision level LV. When the advice determination portion 15 determines that the driver has the driving tendency to ignore the fuel economy advice, the advice determination portion 15 decreases the advice provision frequency by decrementing the advice provision level LV, as shown in FIG. 3B.

When the advice determination portion 15 determines that the driving operation, which is not in accordance with the content of the output fuel economy advice, is not due to the driving tendency of the driver (NO in step S70), the advice determination portion 15 determines that the driving operation, which is not in accordance with the content of the fuel economy advice, is unusual driving operation, and maintains the advice provision level LV so that the mode of providing the fuel economy advice is not changed.

Step S20 and subsequent steps are repeatedly executed until the vehicle reaches the final destination on the fuel consumption reduction route (NO in step S90). When the vehicle reaches the destination (YES in step S90), the advice provision level LV is stored in the driver database 14 (step S100).

Accordingly, in the above-described embodiment, it is possible to provide the fuel economy advice that is readily acceptable to the driver, according to the driving tendency of the driver. That is, when the actual driving operation or the actual travel route is in accordance with the content of the fuel economy advice, it is determined that the driver is likely to accept the fuel economy advice. In this case, for example, the advice provision frequency or the advice provision level is increased. Thus, it is possible to further increase the effect of the fuel economy advice. When the actual driving operation or the actual travel route is different from the content of the fuel economy advice, and the driving operation is not exceptional operation (for example, the driving operation for avoiding an accident, or the driving operation at the time of emergency), it is determined that the driver is less likely to accept the fuel economy advice. In this case, the advice provision frequency or the advice provision level is decreased. Thus, it is possible to reduce driver's discomfort, and to provide the fuel economy advice in accordance with the driving tendency of the driver. However, even when it is determined that the driver is less likely to accept the fuel economy advice, the advice provision frequency or the advice provision level may not be decreased, taking into account a driver's demand, an environmental regulation, or the like. Further, when it is determined that the driver is less likely to accept the fuel economy advice, the advice provision frequency or the advice provision level may be increased.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the claimed invention.

For example, the fuel economy driving assistance apparatus 100 may include an authentication information obtaining portion, an authentication information storage portion, and a driver identification portion. The authentication information obtaining portion, the authentication information storage portion, and the driver identification portion may be regarded as authentication means for authenticating the driver. In this case, the authentication information obtaining portion obtains, from the driver, authentication information for identifying the driver. The authentication information storage portion (for example, the driver database 14) stores specific authentication information that is specific to the driver, and that is used to verify the driver. The driver identification portion identifies the driver based on the authentication information obtained by the authentication information obtaining portion, and the authentication specific information stored in the authentication information storage portion. The driver identification portion may identify the driver, for example, through authentication using a key such as a key of an immobilizer, and biological body authentication such as iris authentication, face authentication, voice print authentication, fingerprint authentication, and vein authentication. Thus, even when a plurality of drivers use the vehicle, it is possible to provide the fuel economy advice appropriate for each driver.

Also, a setting may be made in advance to allow or stop the output of the fuel economy advice when the advice output condition is satisfied, based on the driving situation when the fuel economy advice should be output. For example, in a situation in which the driving load of the driver is high, for example, in a situation in which the vehicle travels on a curved road, the output of the fuel economy advice may be stopped so that the driver does not feel discomfort.

Also, as described above, the advice determination portion 15 estimates the manner in which the driver uses the vehicle, as the driving tendency of the driver. Thus, the advice determination portion 15 may change the fuel consumption reduction route output from the advice output portion 50, according to the result of the estimation relating to the manner in which the driver uses the vehicle. For example, the advice determination portion 15 may automatically recommend the optimal fuel consumption reduction route to the driver through the advice output portion 50, based on the current driving plan information and the surrounding information. Also, by learning the previous driving date and time, and the destination at that time, it is possible to increase the accuracy of estimating the manner in which the driver uses the vehicle. Thus, the advice determination portion 15 may automatically recommend the optimal fuel consumption reduction route, taking into account the fuel consumption reduction route that is previously recommended. For example, the advice determination portion 15 may recommend a second fuel consumption reduction route that is different from the fuel consumption reduction route that is previously recommended.

The invention claimed is:

1. A fuel economy driving assistance apparatus comprising:
an advice provision portion that provides a driver with driving advice that contributes to improvement of fuel economy of a vehicle;
a driving tendency estimation portion that estimates a driving tendency of the driver in each driving situation; and
an advice mode changing portion that changes a mode for providing the driver with the driving advice according to the driving tendency of the driver estimated by the driving tendency estimation portion;
wherein the mode for providing a driver with the driving advice is changed in accordance with an advice provision level,
the fuel economy driving assistance apparatus further comprises an advice determination portion that determines whether the driver performed the driving operation in accordance with a content of the provided driving advice,
wherein when it is determined that the driver performed the driving operation in accordance with the content of the provided driving advice, the advice determination portion increments the advice provision level,
when it is determined that the driver performed the driving operation, due to the driving tendency of the driver, that is not in accordance with the content of the provided driving advice, the advice determination portion decrements the advice provision level, and
when it is determined that the driving operation, which is not in accordance with the content of the provided driving advice, is not due to the driving tendency of the driver, the advice determination portion maintains the advice provision level.

2. The fuel economy driving assistance apparatus according to claim 1, wherein the advice mode changing portion changes the mode of the driving advice to decrease an effect of the driving advice when the driving tendency of the driver is estimated to be that the driver is less likely to accept the driving advice.

3. The fuel economy driving assistance apparatus according to claim 2, wherein the advice mode changing portion decreases an advice provision level when the driving tendency of the driver is estimated to be that the driver is less likely to accept the driving advice.

4. The fuel economy driving assistance apparatus according to claim 1, wherein the advice mode changing portion changes the mode of the driving advice to increase an effect of the driving advice when the driving tendency of the driver is estimated to be that the driver is likely to accept the driving advice.

5. The fuel economy driving assistance apparatus according to claim 4, wherein the advice mode changing portion increases an advice provision level when the driving tendency of the driver is estimated to be that the driver is likely to accept the driving advice.

6. The fuel economy driving assistance apparatus according to claim 1, wherein the advice mode changing portion stops providing the driving advice in a situation in which a driving load of the driver is high, regardless of the driving tendency of the driver estimated by the driving tendency estimation portion.

7. The fuel economy driving assistance apparatus according to claim 6, wherein the advice mode changing portion stops providing the driving advice in a situation in which the vehicle travels on a curved road, regardless of the driving tendency of the driver estimated by the driving tendency estimation portion.

8. The fuel economy driving assistance apparatus according to claim 1, further comprising vehicle travel record storage portion that stores a record of travel of the vehicle,
wherein the driving tendency estimation portion estimates the driving tendency of the driver using the record of the travel of the vehicle.

9. The fuel economy driving assistance apparatus according to claim 8, wherein the driving tendency estimation portion estimates the driving tendency of the driver using a state amount of the vehicle detected after the driving advice is provided to the driver.

10. The fuel economy driving assistance apparatus according to claim 9, wherein the driving tendency estimation portion estimates the driving tendency of the driver based on the number of mismatched times between a content of the driving advice and driving operation performed by the driver during a predetermined period after the driving advice is provided to the driver.

11. The fuel economy driving assistance apparatus according to claim 1, wherein the advice mode changing portion changes at least one of an advice provision manner and advice content, according to the driving tendency of the driver.

12. The fuel economy driving assistance apparatus according to claim 11, wherein the advice mode changing portion changes the advice provision manner so that the driving advice is provided to the driver using voice when the driving tendency of the driver is estimated to be that the driver is likely to accept the driving advice.

13. The fuel economy driving assistance apparatus according to claim 11, wherein the advice mode changing portion changes the advice provision manner so that the driving advice is provided to the driver using voice and a visual display when the driving tendency of the driver is estimated to be that the driver is likely to accept the driving advice.

14. The fuel economy driving assistance apparatus according to claim 11, wherein the advice mode changing portion increases a frequency of the advice that is provided to the driver when the driving tendency of the driver is estimated to be that the driver is likely to accept the driving advice.

15. The fuel economy driving assistance apparatus according to claim 1, further comprising a fuel-consumption reduction route search portion that searches for a fuel consumption reduction route to a destination, based on information relating to at least one of a driving plan of the driver, a traffic situation, and a state amount of the vehicle,
wherein the advice provision portion provides the driver with the fuel consumption reduction route.

16. The fuel economy driving assistance apparatus according to claim 15, wherein the fuel-consumption reduction route search portion searches for the fuel consumption reduction route based on information relating to at least one of traffic congestion, a road inclination, and a curved road, through an area extending to the destination of the driver.

17. The fuel economy driving assistance apparatus according to claim 15, wherein when the vehicle uses an engine and a motor as driving sources, the fuel-consumption reduction route search portion searches for the fuel consumption reduction route in which the motor is preferred to the engine as the driving source, based on at least one of a distance to a destination of the driver, a remaining battery charge, and a road inclination.

18. The fuel economy driving assistance apparatus according to claim 1, further comprising a driver authentication portion that identifies a driver,
wherein the advice mode changing portion changes a mode of the driving advice according to the driving tendency of the identified driver.

19. A fuel economy driving assistance apparatus comprising:
an advice provision portion that provides a driver with driving advice that contributes to improvement of fuel economy of a vehicle;
a driving tendency estimation portion that estimates a driving tendency of the driver in each driving situation;
an advice mode changing portion that changes a mode for providing the driver with the driving advice according to the driving tendency of the driver estimated by the driving tendency estimation portion; and
an advice determination portion that determines whether the driver performs the driving operation in accordance with a content of the provided driving advice,
wherein when the advice determination portion determines that the driver performed the driving operation in accordance with the content of the provided driving advice, the advice mode changing portion changes the mode for providing the driver with the driving advice with increased details,
when the advice determination portion determines that the driver performed the driving operation, due to the driving tendency of the driver, that is not in accordance with the content of the provided driving advice, the advice mode changing portion changes the mode for providing the driver with the driving advice with decreased details, and
when the advice determination portion determines that the driving operation, which is not in accordance with the content of the provided driving advice, is not due to the driving tendency of the driver, the advice mode changing portion maintains the mode for providing the driver with the driving advice.

* * * * *

UNITED STATES PATENT AND TRADEMARK OFFICE
CERTIFICATE OF CORRECTION

| | |
|---|---|
| PATENT NO. | : 8,606,459 B2 |
| APPLICATION NO. | : 12/676811 |
| DATED | : December 10, 2013 |
| INVENTOR(S) | : H. Sekiyama et al. |

It is certified that error appears in the above-identified patent and that said Letters Patent is hereby corrected as shown below:

In the Specification

At column 1, line 4, after the title, insert the following paragraph:

-- This is a 371 national phase application of PCT/IB2008/002309 filed 05 September 2008, claiming priority to Japanese Patent Application No. 2007-231723 filed 06 September 2007, the contents of which are incorporated herein by reference. --

Signed and Sealed this
Twenty-seventh Day of May, 2014

Michelle K. Lee
*Deputy Director of the United States Patent and Trademark Office*